(12) United States Patent
Galford (10) Patent No.: US 11,604,303 B2
(45) Date of Patent: Mar. 14, 2023

(54) PHOTOELECTRIC ABSORPTION CORRECTION FOR WELLBORE LOGGING

(71) Applicant: Halliburton Energy Services, Inc., Houston, TX (US)

(72) Inventor: James E. Galford, Missouri City, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 221 days.

(21) Appl. No.: 17/087,197

(22) Filed: Nov. 2, 2020

(65) Prior Publication Data

US 2022/0137254 A1    May 5, 2022

(51) Int. Cl.
*G01V 5/12*    (2006.01)

(52) U.S. Cl.
CPC ..................... *G01V 5/12* (2013.01)

(58) Field of Classification Search
CPC ....................................... G01V 5/12
See application file for complete search history.

(56) References Cited

U.S. PATENT DOCUMENTS

| | | | |
|---|---|---|---|
| 4,436,996 A * | 3/1984 | Arnold | G01V 5/06 250/262 |
| 4,542,292 A | 9/1985 | Ellis | |
| 5,120,955 A | 6/1992 | Galford et al. | |
| 5,912,460 A | 6/1999 | Stoller et al. | |
| 2003/0057366 A1 | 3/2003 | Gzara et al. | |
| 2008/0083872 A1 * | 4/2008 | Huiszoon | G01V 5/125 250/269.3 |
| 2018/0210109 A1 | 7/2018 | Guo et al. | |
| 2019/0219732 A1 | 7/2019 | Galford | |

OTHER PUBLICATIONS

PCT Application No. PCT/US2020/058562, International Search Report and Written Opinion, dated Jul. 28, 2021, 10 pages.
Flanagan et al., "A New Generation Nuclear Logging System", SPWLA 32$^{nd}$ Annual Logging Symposium, Jun. 1991, 25 pages.
Koizumi, "Computer Determination of Calibration and Environmental Corrections for a Natural Spectral Gamma Ray Logging System", Society of Petroleum Engineers, Formation Evaluation, Sep. 1988, 8 pages.

* cited by examiner

*Primary Examiner* — Mohamed Charioui
*Assistant Examiner* — Christine Y Liao
(74) *Attorney, Agent, or Firm* — Kilpatrick Townsend & Stockton LLP (57) ABSTRACT

A system is disclosed for correcting Uranium-free gamma logs. The system may receive data about a subterranean formation from a gamma-ray-logging process in a wellbore. The system may apply a photoelectric-suppression estimator to the data to determine a photoelectric-suppression factor using stored mud parameters and a wellbore diameter value. The data may be corrected by the system by using the photoelectric-suppression factor to generate a Uranium-free, gamma-ray log. The system may output the Uranium-free, gamma-ray log for determining characteristics of the subterranean formation.

20 Claims, 6 Drawing Sheets

PHOTOELECTRIC ABSORPTION CORRECTION FOR WELLBORE LOGGING

TECHNICAL FIELD

The present disclosure relates generally to wellbore operations and, more particularly (although not necessarily exclusively), to correcting photoelectric absorption for wellbore logging.

BACKGROUND

A wellbore for extracting hydrocarbon can be formed by a drilling operation that can penetrate a subterranean formation. The drilling operation may encounter various types of radioactive elements while drilling the wellbore, and various muds may be pumped downhole for cooling a drill bit, returning cuttings to the surface, or other purposes. Spectral analysis, such as gamma-ray logging, may be performed on downhole mud for determining concentrations of certain elements in the wellbore. Spectral analysis can yield inaccurate results, or involve significant computational time to deliver reliable results.

DETAILED DESCRIPTION

Certain aspects and examples of the present disclosure relate to correcting logs for a wellbore and using a photoelectric-suppression estimator to output Uranium-free, gamma-ray logs. The gamma-ray logs may be an output of a spectral analysis process performed as the wellbore is being formed by a drilling operation. The Uranium-free, gamma-ray logs may indicate an amount of radioactive material in a subterranean formation by recording an amount of detected photons or other charged particles. The photoelectric suppression estimator can be applied to data about the subterranean formation to determine a photoelectric-suppression factor using mud parameters and the diameter of the wellbore. The data can be corrected using the photoelectric-suppression factor to generate a Uranium-free, gamma-ray log. The process may be performed in a logging-while-drilling mode of operation with respect to the wellbore.

For example, in an unprocessed configuration, the logs may be skewed or otherwise inaccurate due to photoelectric suppression effects occurring in the wellbore. An example of a factor that may impact the photoelectric suppression effects is mud parameters, such as mud weight or mud density. Some examples of the present disclosure can correct the logs by applying a photoelectric suppression estimator to generate a Uranium-free gamma-ray log, yielding a more accurate representation of the amount of radioactive material in the subterranean formation. The photoelectric suppression estimator may use inputs such as the mud parameters and a photoelectric suppression factor, among other suitable types of inputs, for determining the corrected log.

Uranium-free, gamma-ray outputs from spectral gamma ray logs can, under some circumstances, result in unrealistic values that exceed a measured total gamma-ray response. But, an initial, Uranium-free, gamma-ray calculation can be corrected for low-energy photoelectric absorption effects based on mud parameters such as mud density and a material used to weight the mud. Spectral gamma-ray processing can make an initial estimate of a Uranium-free gamma-ray log based upon Thorium and Potassium elemental concentrations obtained from analyzing measured pulse-height natural gamma-ray spectra within a wellbore, A Uranium-free gamma-ray counting rate can be determined by summing unit-concentration counting rates for Thorium and Potassium at standard logging conditions. The rates may be multiplied by corresponding, environmentally corrected elemental concentrations. But, the calculated counting rate may over-estimate a true counting rate when the borehole includes a mud with a density greater than the density of water because the calculated counting rate may use responses that represent typical, standard logging conditions in a water-filled borehole. Converting the calculated counting rate into API gamma-ray units can result in a Uranium-free gamma-ray output that exceeds the total gamma-ray log, especially when an amount of Uranium in the subterranean formation is small, or zero.

Some aspects of the present disclosure can overcome this problem by correcting the unit concentration counting rates to account for photoelectric absorption of low-energy gamma rays as a function of mud density, type of weighting material (e.g., barite, hematite, and formate), and borehole diameter. Monte Carlo modeling may be used to simulate pulse-height spectra for multiple combinations of mud photoelectric absorption indices and borehole diameters. Directly comparing the low energy regions of the simulated spectra with respect to standard condition spectra quantified counting rate reductions caused by photoelectric absorption may occur for each case. Correlations between mud photoelectric absorption index and low-energy gamma-ray reductions from photoelectric absorption for individual borehole diameters may provide information to produce a predictive counting rate reduction algorithm spanning the working range of borehole diameters. A mud photoelectric-absorption index may not be a readily available wellsite parameter in some cases, but correlations between mud density and mud photoelectric-absorption index for typical mixtures for each of the primary weighting materials can provide an alternative.

Total gamma-ray logs may not fully indicate subterranean formation clay content, such as in situations in which the subterranean formation includes substantial amounts of Uranium since, unlike Thorium and Potassium, Uranium is not usually associated with clay, or alumino-silicate, minerals. Uranium-free gamma-ray logs may provide a better indication of clay content in petro-physical evaluations. Accuracy of the Uranium-free gamma-ray output from spectral gamma-ray logs can be improved, however. And, using some examples of the present disclosure can involve real-time applications without requiring multiple passes through data of the Uranium-free gamma-ray logs to estimate average low-energy counting rate reductions and apply the reductions used in other attempts.

The influence of photoelectric absorption may suppress counting rates between a low-energy discriminator and a lower limit, in which spectral fitting occurs to obtain subterranean formation Thorium, Uranium, and Potassium elemental concentrations. Even though the region between the low-energy discriminator and the lower limit may not be involved in determining elemental concentrations from spectral gamma-ray measurements, its influence may be involved in providing a Uranium-free gamma-ray output that is comparable to the standard, total gamma-ray measurement that may include all gamma-rays with energies exceeding the low-energy discriminator. Total counting rates above the low-energy discriminator from the Thorium and Potassium spectral standards may be used to determine the Uranium-free gamma ray output. The total counting rates may be too large for cases involving a borehole filled with a fluid that is denser than water or when the borehole diameter is greater than a nominal, standard condition. When combined with the Thorium and Potassium elemental concentrations, the total counting rates can lead to a counting rate that exceeds the measured total counting rate above the low-energy discriminator and can lead to an apparent Uranium-free gamma-ray log that is larger than standard total gamma-ray output. This issue may become noticeable when logging formations containing little or no Uranium.

According to one example of the present disclosure, a predictive photoelectric suppression estimator can use available mud parameters and a value for the borehole diameter to apply a correction of the gamma-ray logs in a single pass through the data. Corrected Uranium-free gamma-ray logs can be determined concurrent with real-time data acquisition. Developing the photoelectric suppression estimator may involve various processes. In one process, a computing device may generate Monte-Carlo-modeled pulse-height spectra. The spectra can be simulated cases for representing typical subterranean formation responses for standard logging conditions and various combinations of borehole diameter and mud density. The computing device may subsequently determine photoelectric suppression factors for each of the simulated cases by using borehole diameters and mud conditions that depart from the standard logging conditions. For this operation, the simulated cases departing from standard conditions can be normalized to a reference, standard condition spectrum in the spectral fitting energy range. The computing device may determine a low-energy counting rate for the reference, normalized spectrum over the energy range from the low-energy discriminator up to the lower limit in which spectral fitting for elemental concentrations occurs. Photoelectric suppression factors for each case may be determined by computing ratios of the normalized, low-energy counting rates and the standard condition simulated counting rate from the same energy range in the standard condition simulated spectrum. In response to determining the ratios, the computing device may gather and transform a collection of photoelectric suppression factors, borehole diameters, and mud photoelectric absorption index values into a continuous, predictive photoelectric suppression factor algorithm that is a function of mud photoelectric absorption index, borehole diameter, and material used to weight the mud.

The type of weighting material for mud may be considered since different weighting compounds have different photoelectric absorption index values, and, the impact of different weighting compounds may vary. For example, the photoelectric absorption index of hematite can be less than that of barite and of cesium formate. And, muds weighted with hematite may produce less photoelectric absorption than barite muds of similar density in a similarly sized borehole. Using the predictive photoelectric suppression factor algorithm as a function of the mud photoelectric absorption index can represent a probability for photoelectric absorption to occur within the mud. But, mud photoelectric absorption index may not be a parameter that is available at the wellsite. Correlations can be constructed for generic mud mixtures according to the weighting material, to adequately estimate mud photoelectric absorption index according to mud density, which may be more available.

Illustrative examples are given to introduce the reader to the general subject matter discussed herein and are not intended to limit the scope of the disclosed concepts. The following sections describe various additional features and examples with reference to the drawings in which like numerals indicate like elements, and directional descriptions are used to describe the illustrative aspects, but, like the illustrative aspects, should not be used to limit the present disclosure.

Figure 1:
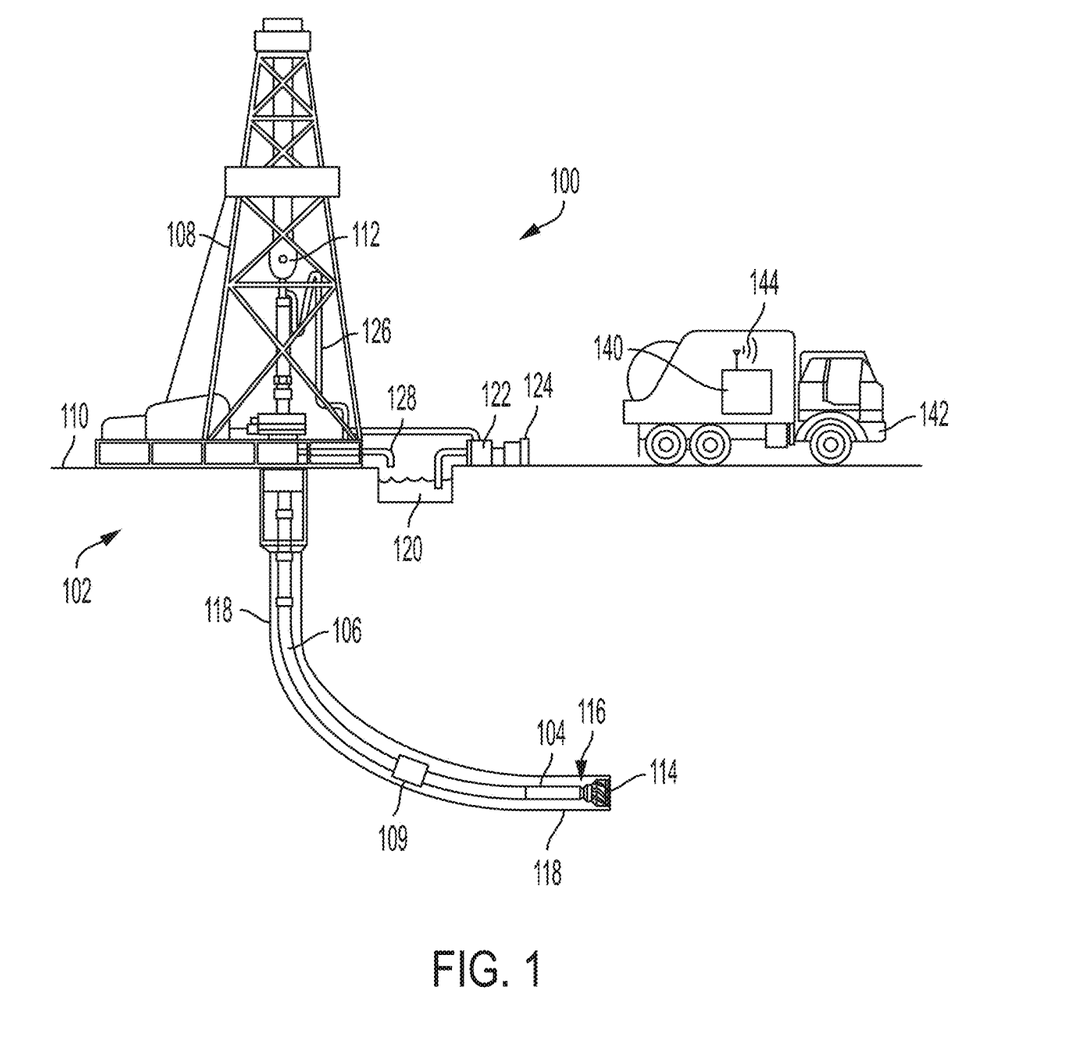
FIG. 1 is a cross-sectional view of a wellbore-drilling system including a wellbore formed by a drilling operation, and a subsystem to correct gamma-ray logs from the wellbore according to one example of the present disclosure.

FIG. 1 is a cross-sectional view of a wellbore-drilling system 100 including a wellbore 118 formed by a drilling operation that corrects gamma-ray logs from the wellbore 118, according to one example of the present disclosure. The wellbore 118 used to extract hydrocarbons may be created by drilling into a subterranean formation 102 using the wellbore-drilling system 100. The wellbore-drilling system 100 may drive a bottom hole assembly (BHA) 104 positioned or otherwise arranged at the bottom of a drill-string 106 extended into the subterranean formation 102 from a derrick 108 arranged at the surface 110. The derrick 108 includes a kelly 112 used to lower and raise the drill-string 106. The BHA 104 may include a drill bit 114 operatively coupled to a tool string 116, which may be moved axially within a drilled wellbore 118 as attached to the drill-string 106. The tool string 116 may include one or more sensors 109 for determining conditions in the wellbore 118. The sensors 109 may be positioned on drilling equipment, which may be deployed downhole in the wellbore 118, and may sense values of mud parameters in the wellbore 118. The sensors 109 can transmit real-time signals to the surface 110 via a wired or wireless connection to transmit real-time data relating to mud parameters to the surface 110. The combination of any support structure (in this example, the derrick 108), any motors, electrical equipment, and support for the drill-string and tool string may be referred to herein as a drilling arrangement.

During operation, the drill bit 114 penetrates the subterranean formation 102 to create the wellbore 118. The BHA 104 can provide control of the drill bit 114 as the drill bit 114 advances into the subterranean formation 102. The combination of the BHA 104 and the drill bit 114 can be referred to as a "drilling tool." Fluid or mud from a mud tank 120 may be pumped downhole using a mud pump 122 powered by an adjacent power source, such as a prime mover or motor 124. The mud may be pumped from the mud tank 120, through a stand pipe 126, which feeds the mud into the drill-string 106 and conveys the same to the drill bit 114. The mud exits one or more nozzles (not shown) arranged in the drill bit 114 and in the process cools the drill bit 114. After exiting the drill bit 114, the mud circulates back to the surface 110 via the annulus defined between the wellbore 118 and the drill-string 106, and drill cuttings and debris may be returned to the surface 110. The cuttings and mud mixture are passed through a flow line 128 and are processed such that a cleaned mud is returned down hole through the stand pipe 126 once again.

The drilling arrangement and any sensors 109 (through the drilling arrangement or directly) may be communicatively coupled to a computing device 140. The computing device 140 can correct gamma-ray logs associated with the wellbore 118 and perform any other operation for gamma-ray logs associated with the wellbore 118. In FIG. 1, the computing device 140 is illustrated as being deployed in a work vehicle 142; however, a computing device to receive data from the sensors 109 and to control the drill bit 114 can be permanently installed with the drilling arrangement, be hand-held, or be remotely located. Although one computing device is depicted in FIG. 1, in other examples, more than one computing device can be used, and together, the multiple computing devices can perform operations, such as those described in the present disclosure.

The computing device 140 can include a communication device 144. The communication device 144 can represent one or more of any components that facilitate a network connection. In the example shown in FIG. 1, the communication devices 144 are wireless and can include wireless interfaces such as IEEE 802.11, Bluetooth™, or radio interfaces for accessing cellular telephone networks (e.g., transceiver/antenna for accessing a CDMA, GSM, UMTS, or other mobile communications network). In some examples, the communication device 144 can use acoustic waves, surface waves, vibrations, optical waves, or induction (e.g., magnetic induction) for engaging in wireless communications. In other examples, the communication device 144 can be wired and can include interfaces such as Ethernet, USB, IEEE 1394, or a fiber optic interface. In an example with at least one other computing device, the computing device 140 can receive wired or wireless communications from the other computing device and perform one or more tasks based on the communications.

Figure 2:
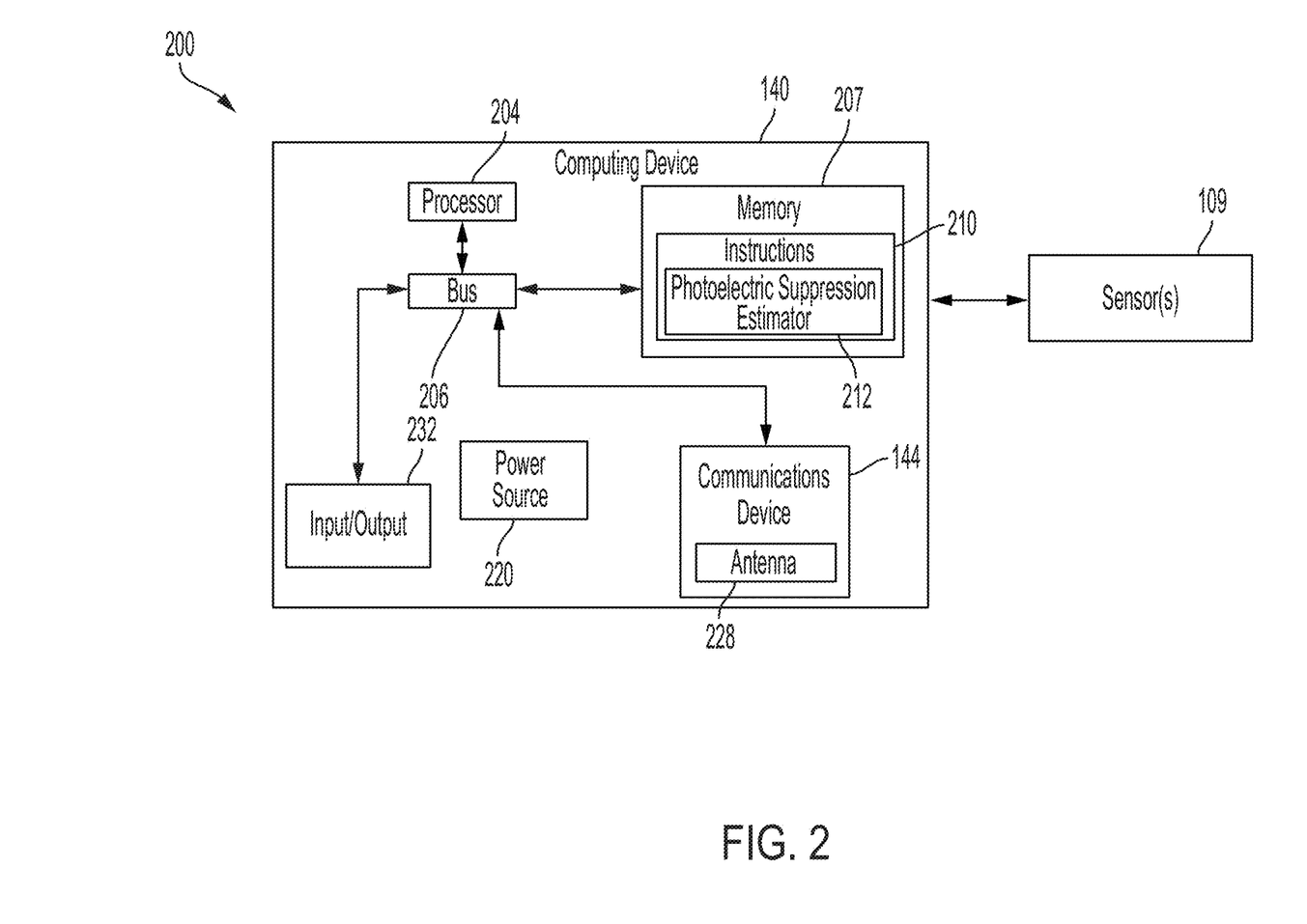
FIG. 2 is a block diagram of a computing system to correct Uranium-free, gamma-ray logs from a wellbore according to one example of the present disclosure.

FIG. 2 is a block diagram of a computing system 200 that can correct Uranium-free gamma-ray logs associated with a wellbore according to one example of the present disclosure. The components shown in FIG. 2 (e.g. the computing device 140, power source 220, communications device 144, etc.) can be integrated into a single structure. For example, the components can be within a single housing. In other examples, the components shown in FIG. 2 can be distributed via separate housings or otherwise, and in electrical communication with each other.

The system 200 may include the computing device 140. The computing device 140 can include a processor 204 interfaced with other hardware via a bus 206. A memory 207, which can include any suitable tangible (and non-transitory) computer-readable medium, such as random-access memory ("RAM"), read-only memory ("ROM"), electrically erasable and programmable read-only memory ("EEPROM"), or the like, can embody program components that configure operation of the computing device 140. In some aspects, the computing device 140 can include input/output interface components (e.g., a display, printer, keyboard, touch-sensitive surface, and mouse) and additional storage.

The processor 204 can execute one or more operations for correcting Uranium-free gamma-ray logs to better identify downhole radioactive elements. For example, the processor 204 can execute a photoelectric suppression estimator 212, which can be stored in instructions 210 that may be included in the memory 207, for correcting the gamma-ray logs. The instructions 210 may include other suitable instructions for correcting the gamma-ray logs. The processor 204 can execute instructions stored in the memory 207 to perform the operations. The processor 204 can include one processing device or multiple processing devices or cores. Non-limiting examples of the processor 204 include a Field-Programmable Gate Array ("FPGA"), an application-specific integrated circuit ("ASIC"), a microprocessor, etc.

The processor 204 can be communicatively coupled to the memory 207 via the bus 206. The memory 207 may be non-volatile and may include any type of memory device that retains stored information when powered off. Non-limiting examples of the memory 207 include EEPROM, flash memory, or any other type of non-volatile memory. In some examples, at least part of the memory 207 can include a medium from which the processor 204 can read instructions. A computer-readable medium can include electronic, optical, magnetic, or other storage devices capable of providing the processor 204 with computer-readable instructions or other program code. Non-limiting examples of a computer-readable medium include (but are not limited to) magnetic disk(s), memory chip(s), ROM, RAM, an ASIC, a configured processor, optical storage, or any other medium from which a computer processor can read instructions. The instructions can include processor-specific instructions generated by a compiler or an interpreter from code written in any suitable computer-programming language, including, for example, C, C++, C #, etc.

The system 200 can include a power source 220. The power source 220 can be in electrical communication with the computing device 140 and the communications device 144. In some examples, the power source 220 can include a battery or an electrical cable (e.g., a wireline). The power source 220 can include an AC signal generator. The computing device 140 can operate the power source 220 to apply a transmission signal to the antenna 228 to forward data relating to mud parameters, gamma-ray logs, etc. to other systems. For example, the computing device 140 can cause the power source 220 to apply a voltage with a frequency within a specific frequency range to the antenna 228. This can cause the antenna 228 to generate a wireless transmission. In other examples, the computing device 140, rather than the power source 220, can apply the transmission signal to the antenna 228 for generating the wireless transmission.

In some examples, part of the communications device 144 can be implemented in software. For example, the communications device 144 can include additional instructions stored in memory 207 for controlling functions of the communication device 144. The communications device 144 can receive signals from remote devices and transmit data to remote devices. For example, the communications device 144 can transmit wireless communications that are modulated by data via the antenna 228. In some examples, the communications device 144 can receive signals (e.g. associated with data to be transmitted) from the processor 204 and amplify, filter, modulate, frequency shift, or otherwise manipulate the signals. In some examples, the communications device 144 can transmit the manipulated signals to the antenna 228. The antenna 228 can receive the manipulated signals and responsively generate wireless communications that carry the data.

The computing system 200 can receive input from sensors 109. The computing system 200 in this example also includes input/output interface 232. Input/output interface 232 can connect to a keyboard, pointing device, display, and other computer input/output devices. An operator may provide input using the input/output interface 232. Gamma-ray logs can be displayed to an operator of the drilling operation through a display that is connected to or is part of input/output interface 232. The displayed gamma-ray logs can provide an advisory function to the operator, or to a supervisor of the drilling operation, who can make adjustments to the drilling operation based on the displayed values.

Figure 3:
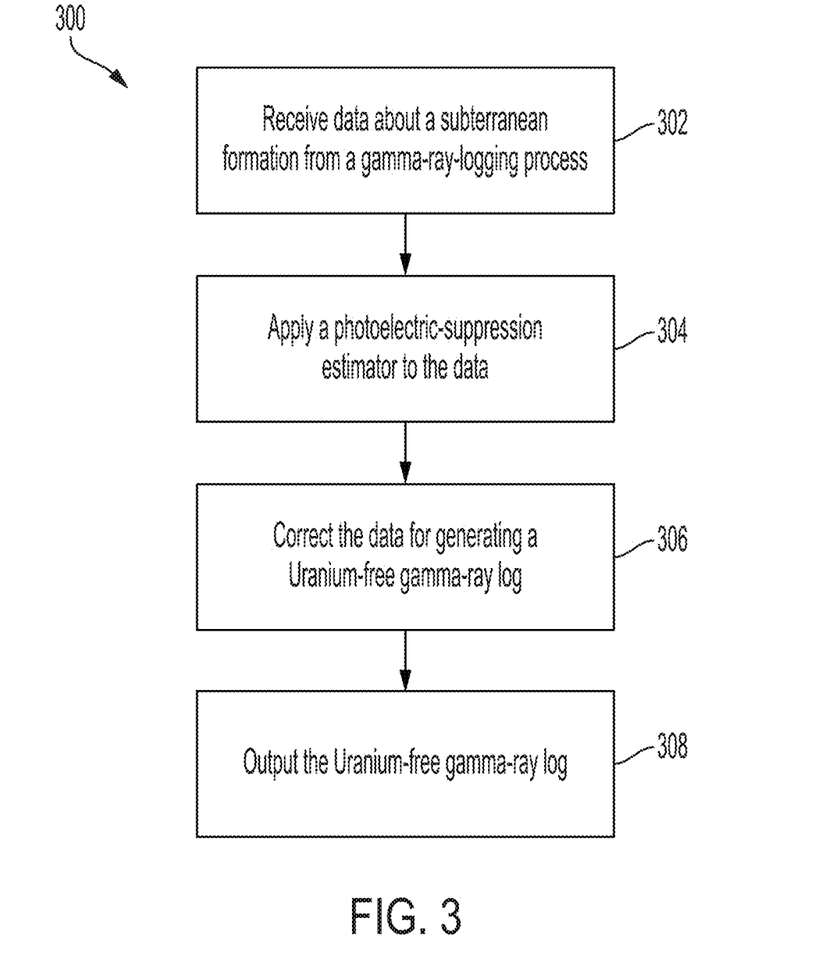
FIG. 3 is a flow chart of a process for correcting Uranium-free, gamma-ray logs according to one example of the present disclosure.

FIG. 3 is a flow chart of a process 300 for correcting Uranium-free gamma-ray logs from a wellbore according to one example of the present disclosure. At block 302, the computing device 140 receives data about a subterranean formation 102 from a gamma-ray-logging process. The data may include a gamma-ray log, and the data may include information relating to downhole conditions such as amounts of radioactive elements located in the subterranean formation 102. The radioactive elements may include Thorium, Potassium, and the like. In some examples, more than one gamma-ray log may be received by the computing device 140. The gamma-ray log may be a Uranium-free gamma-ray log in which Uranium is present in no more than trace amounts. In some examples, the computing device 140 may receive an initial estimate of a Uranium-free gamma-ray log based upon Thorium and Potassium elemental concentrations obtained from analyzing measured pulse-height natural gamma-ray spectra within the wellbore 118.

At block 304, the computing device 140 applies a photoelectric suppression estimator to the data. The photoelectric suppression estimator may be generated from an algorithm having inputs of photoelectric suppression factors, borehole diameters, and mud parameters, and the computing device 140 can apply the photoelectric suppression estimator to the gamma-ray log received at block 302. In some examples, the computing device 140 may apply the photoelectric suppression estimator to the initial estimate of a Uranium-free gamma-ray log. Applying the photoelectric suppression estimator may involve a single-pass algorithm in which the computing device 140 applies the photoelectric suppression estimator exactly once to each value of the gamma-ray log.

At block 306, the computing device 140 corrects the data for generating a Uranium-free gamma-ray log. In applying the photoelectric suppression estimator to the gamma-ray log, the computing device 140 may correct the gamma-ray log. That is, the gamma-ray log received at block 302 may initially be inaccurate, and applying the photoelectric estimator at block 304 may generate a corrected Uranium-free gamma-ray log that more accurately represents downhole conditions in the wellbore 118 as compared to the received gamma-ray log. In some examples, an output of the block 306 may be a corrected, Uranium-free gamma-ray log.

At block 308, the computing device 140 outputs the corrected, Uranium-free gamma-ray log. Upon correcting the gamma-ray log, the computing device 140 may output the corrected, Uranium-free gamma-ray log. In some examples, the corrected Uranium-free gamma-ray log can be output to a display device of the drilling operation for advisory functions. An operator or supervisor of the drilling operation may view the displayed, corrected, Uranium-free gamma-ray log and make operational decisions based on viewing the displayed, corrected, Uranium-free gamma-ray log. For example, the operator or supervisor of the drilling operation may update drilling parameters in response to viewing the displayed, corrected, Uranium-free gamma-ray log.

Figure 4:
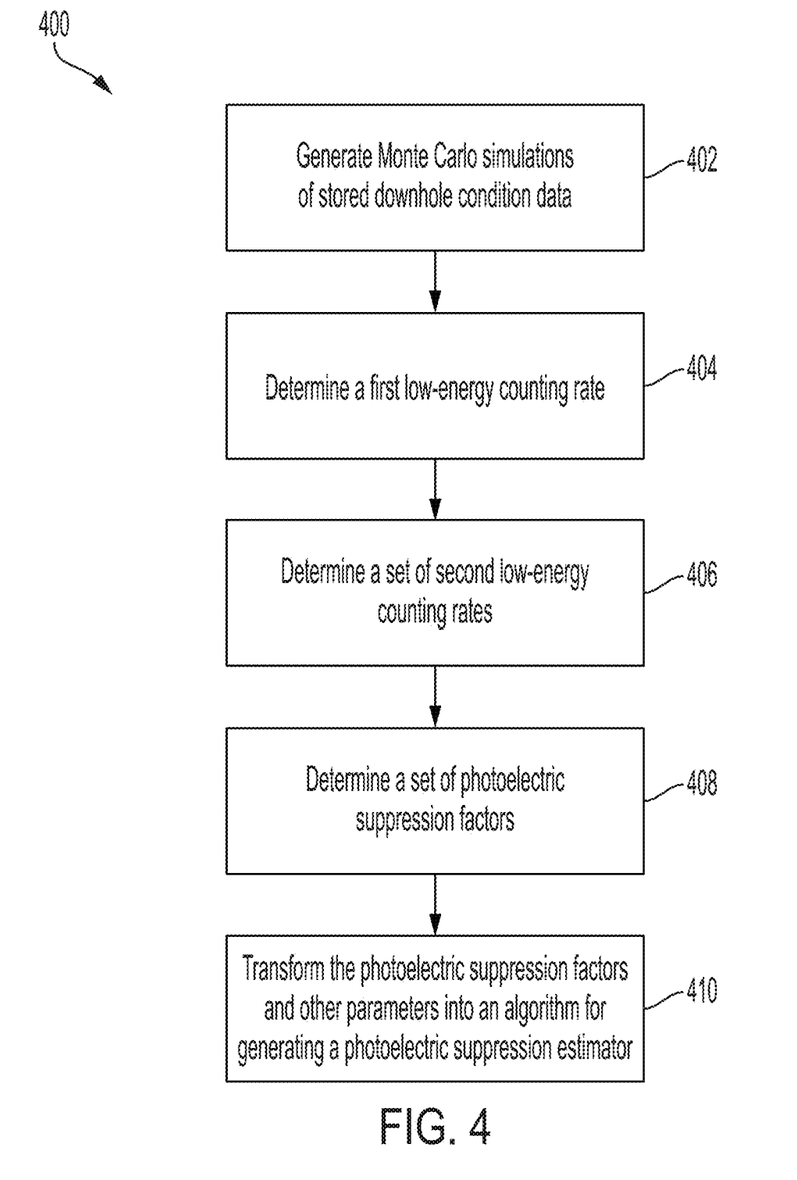
FIG. 4 is a flow chart of a process for generating a photoelectric suppression estimator that can correct logs for photoelectric adsorption according to one example of the present disclosure.

FIG. 4 is a flow chart of a process 400 for generating a photoelectric suppression estimator, according to one example of the present disclosure. At block 402, the computing device 140 generates Monte Carlo simulations of stored downhole condition data. A set of Monte Carlo simulations may be generated by the computing device 140, the simulations representing stored downhole conditions of the wellbore. In generating the Monte Carlo simulations, the computing device 140 generates sets of wellbore diameter data associated with sets of mud density data, each set being a simulated case. The simulated cases may include standard simulated conditions and non-standard simulated conditions that represent standard downhole conditions and non-standard downhole conditions, respectively.

At block 404, the computing device 140 determines a first low-energy counting rate. The computing device 140 may determine the first low-energy counting rate based on a reference spectrum of a standard simulated condition included in the Monte Carlo simulations. The first low-energy counting rate may be contained within a spectral fitting range that may be between a low-energy discriminator and a lower limit of spectral fitting. In some examples, only one first low-energy counting rate is determined since the first low-energy counting rate is based on standard wellbore conditions.

At block 406, the computing device 140 determines a set of second low-energy counting rates. The second low-energy counting rates may be determined by the computing device 140 based on spectra representing the non-standard simulated conditions generated at the block 402. The second low-energy counting rates may include any suitable number of second low-energy counting rates for determining a photoelectric suppression factor, and in some examples, an amount of the second low-energy counting rates may be the same as an amount of simulated cases having non-standard simulated conditions. The second low-energy counting rates may be contained within a spectral fitting range that may be between a low-energy discriminator and a lower limit of spectral fitting.

At block 408, the computing device 140 determines a set of photoelectric suppression factors. The computing device 140 may determine the photoelectric suppression factors based at least in part on the first low-energy counting rate and the set of second low-energy counting rates. A set of ratios can be calculated by the computing device 140, the set of ratios including ratios of the first low-energy counting rate to each second low-energy counting rate of the set of second low-energy counting rates. In some examples, the ratios may be the photoelectric suppression factors, and in other examples, the computing device 140 may use the ratios to further calculate the photoelectric suppression factors.

At block 410, the computing device 140 transforms the photoelectric suppression factors and other parameters into an algorithm for generating a photoelectric suppression estimator. The computing device 140 may transform the photoelectric suppression factors into the algorithm along with other inputs such as a borehole diameter of the wellbore 118, mud parameters like mud weight, mud density, etc., and any other suitable input for determining the photoelectric suppression estimator. The algorithm may output the photoelectric suppression estimator, and the computing device 140 may subsequently use the photoelectric suppression estimator to correct Uranium-free gamma-ray logs from the wellbore 118.

Figure 5:
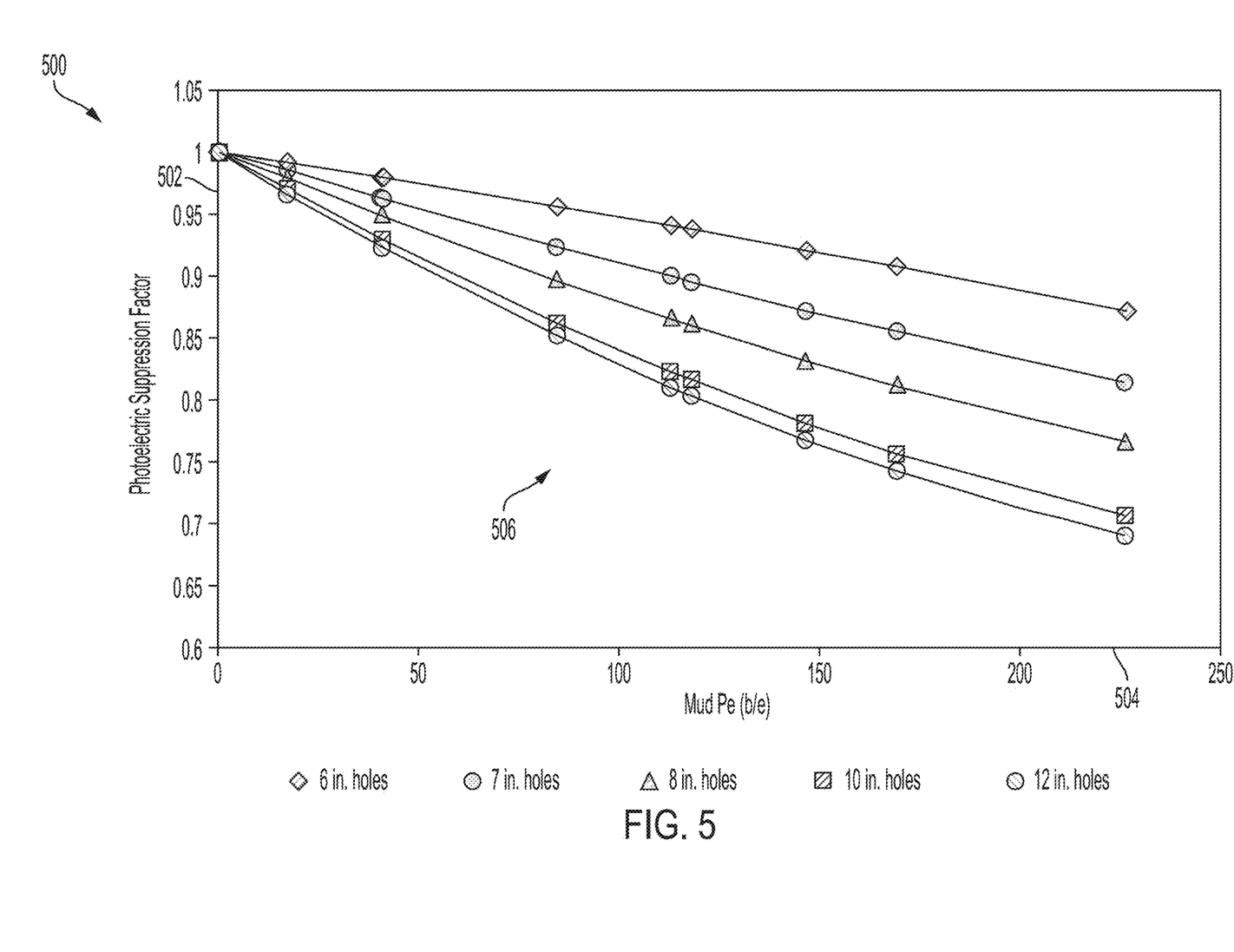
FIG. 5 is an example of a graph showing photoelectric suppression factors and mud photoelectric indices in connection with correcting Uranium-free, gamma-ray logs according to one example of the present disclosure.

FIG. 5 is an example of a graph 500 showing photoelectric suppression factors and mud photoelectric indices, according to one example of the present disclosure. The graph 500, as illustrated, includes a vertical axis 502 and a horizontal axis 504 that represent a photoelectric suppression factor and a mud photoelectric index, respectively. The graph 500 additionally includes five plots 506, each plot of the five plots 506 representing a combination of photoelectric suppression factors and mud photoelectric indices at a unique borehole diameter. The unique borehole diameter may range from 6 inches to 12 inches, or 15.24 cm to 30.48 cm, within the plots 506. The graph 500 shows that, as mud photoelectric index and borehole diameter increases, the photoelectric suppression factor decreases. This relationship means that wellbores with smaller borehole diameters and drilling operations using muds having low photoelectric indices may have less accurate Uranium-free gamma-ray logs before a computing device performs the correction, such as via the process discussed in FIG. 3 at block 306.

Figure 6:
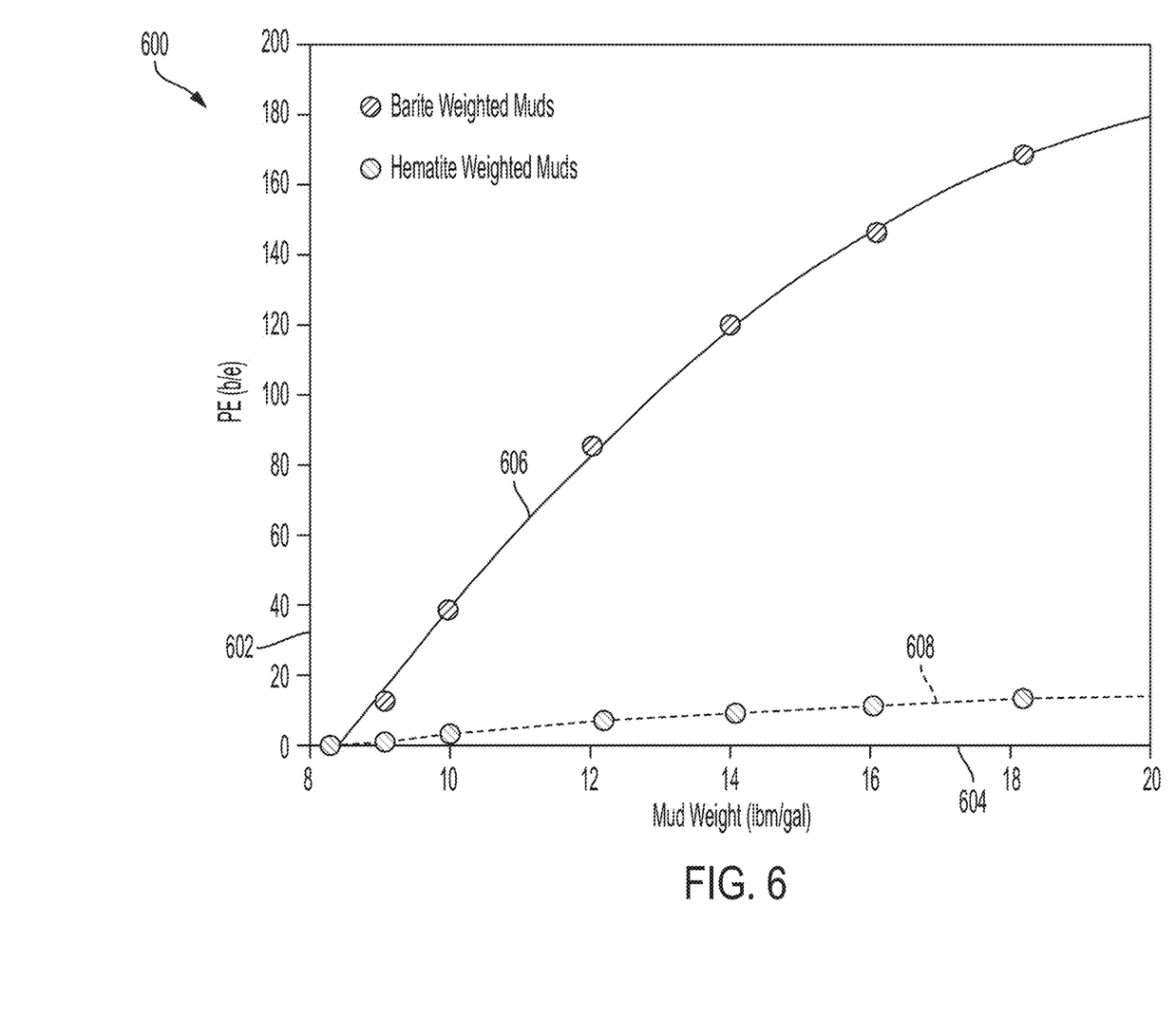
FIG. 6 is an example of a graph showing mud photoelectric indices and mud weight in connection with correction Uranium-free, gamma-ray logs according to one example of the present disclosure.

FIG. 6 is an example of a graph 600 showing photoelectric indices and mud weight, according to one example of the present disclosure. The graph 600, as illustrated, includes a vertical axis 602 and a horizontal axis 604 that represent mud photoelectric index and mud weight, respectively. The graph 600 additionally includes two plots 606 and 608. The plot 606 is a plot of mud photoelectric index versus mud weight for barite and the plot 608 is a plot of mud photoelectric index versus mud weight for hematite. As shown in the plots 606 and 608, the mud photoelectric index for barite is much higher, and increases at a much higher rate proportionally to mud weight, than hematite. As such, Uranium-free gamma-ray logs, not yet being corrected by the computing device 140, from drilling operations that use hematite in large concentrations, being above or around $$10 \frac{\text{lb} * \text{m}}{\text{gal}}, \text{ or } 1.20 \frac{\text{kg} * \text{m}}{\text{L}},$$

may be more accurate than Uranium-free gamma-ray logs, not yet being corrected by the computing device 140, from drilling operations that use barite in similar concentrations.

In some aspects, systems, methods, and non-transitory computer-readable mediums for correcting Uranium-free gamma-ray logs are provided according to one or more of the following examples:

As used below, any reference to a series of examples is to be understood as a reference to each of those examples disjunctively (e.g., "Examples 1-4" is to be understood as "Examples 1, 2, 3, or 4").

Example 1 is a system comprising: a processor; and a non-transitory computer-readable medium comprising instructions that are executable by the processor to cause the processor to perform operations comprising: receiving data about a subterranean formation from a gamma-ray-logging process in a wellbore; applying a photoelectric-suppression estimator to the data to determine a photoelectric-suppression factor using stored mud parameters and a value for a diameter of the wellbore; correcting the data using the photoelectric-suppression factor to generate a Uranium-free, gamma-ray log; and outputting the Uranium-free, gamma-ray log for determining characteristics of the subterranean formation.

Example 2 is the system of example 1, wherein the non-transitory computer-readable medium includes instructions that are executable by the processor to cause the processor to perform operations comprising: generating the photoelectric-suppression estimator by: generating Monte Carlo simulations of stored downhole condition data to generate simulations of a plurality of simulated cases; determining a first low-energy counting rate in a predetermined energy range for a simulated case of the plurality of simulated cases, the simulated case having standard conditions; determining a plurality of second low-energy counting rates in the predetermined energy range; determining a plurality of photoelectric suppression factors using the plurality of second low-energy counting rates and the first low-energy counting rate; and transforming the plurality of photoelectric suppression factors, wellbore diameters, mud type, mud density, and mud photoelectric index factors into an algorithm for generating the photoelectric-suppression estimator.

Example 3 is the system of examples 1 and 2, wherein: the operation of generating the Monte Carlo simulations of stored downhole condition data includes generating sets of wellbore diameter data associated with sets of mud density data, each set of the sets of wellbore diameter data and each set of the sets of mud density data together being a simulated case of the plurality of simulated cases, the Monte Carlo simulations including simulated spectra with standard conditions and simulated spectra with non-standard conditions; the first low-energy counting rate is of a reference, standard condition spectrum of the Monte Carlo simulations; each second low-energy counting rate of the plurality of second low-energy counting rates corresponds to a subset of simulated cases included in the plurality of simulated cases, the subset of simulated cases having non-standard conditions; and the operation of determining a plurality of photoelectric suppression factors using the plurality of second low-energy counting rates and the first low-energy counting rate includes determining a plurality of photoelectric suppression factors by calculating a plurality of ratios of each second low-energy counting rate of the plurality of second low-energy counting rates to the first low-energy counting rate, each photoelectric suppression factor in the plurality of photoelectric suppression factors corresponding to each non-standard simulated case of the plurality of simulated cases.

Example 4 is the system of examples 1-3, wherein the predetermined energy range is between a low-energy discriminator and a lower energy limit that is a lowest energy gamma ray for spectral fitting of Thorium and Potassium.

Example 5 is the system of example 1, wherein the operation of receiving data about the subterranean formation from the gamma-ray-logging process in the wellbore includes receiving an initial estimate of a Uranium-free, gamma-ray log based on Thorium and Potassium elemental concentrations, and wherein the operation of applying the photoelectric-suppression estimator to the data includes applying the photoelectric-suppression estimator to the initial estimate of the Uranium-free, gamma-ray log based on Thorium and Potassium elemental concentrations.

Example 6 is the system of example 1, wherein the operation of correcting the data using the photoelectric-suppression factor to generate the Uranium-free, gamma-ray log includes correcting the data substantially contemporaneously with receiving the data about the subterranean formation from the gamma-ray-logging process in the wellbore.

Example 7 is the system of example 1, wherein the operation of outputting the Uranium-free, gamma-ray log for determining the characteristics of the subterranean formation includes outputting the Uranium-free, gamma-ray log for determining concentrations of Thorium or Potassium in the subterranean formation.

Example 8 is a method comprising: receiving, by a computing device, data about a subterranean formation from a gamma-ray-logging process in a wellbore; applying, by the computing device, a photoelectric-suppression estimator to the data to determine a photoelectric-suppression factor using stored mud parameters and a value for a diameter of the wellbore; correcting, by the computing device, the data using the photoelectric-suppression factor to generate a Uranium-free, gamma-ray log; and outputting, by the computing device, the Uranium-free, gamma-ray log for determining characteristics of the subterranean formation.

Example 9 is the method of example 8, further comprising: generating the photoelectric-suppression estimator by: generating Monte Carlo simulations of stored downhole condition data to generate simulations of a plurality of simulated cases; determining a first low-energy counting rate in a predetermined energy range for a simulated case of the plurality of simulated cases, the simulated case having standard conditions; determining a plurality of second low-energy counting rates in the predetermined energy range; determining a plurality of photoelectric suppression factors using the plurality of second low-energy counting rates and the first low-energy counting rate; and transforming the plurality of photoelectric suppression factors, wellbore diameters, mud type, mud density, and mud photoelectric index factors into an algorithm for generating the photoelectric-suppression estimator.

Example 10 is the method of examples 8 and 9, wherein: the operation of generating the Monte Carlo simulations of stored downhole condition data includes generating sets of wellbore diameter data associated with sets of mud density data, each set of the sets of wellbore diameter data and each set of the sets of mud density data together being a simulated case of the plurality of simulated cases, the Monte Carlo simulations including simulated spectra with standard conditions and simulated spectra with non-standard conditions; the first low-energy counting rate is of a reference, standard condition spectrum of the Monte Carlo simulations; each second low-energy counting rate of the plurality of second low-energy counting rates corresponds to a subset of simulated cases included in the plurality of simulated cases, the subset of simulated cases having non-standard conditions; and the operation of determining a plurality of photoelectric suppression factors using the plurality of second low-energy counting rates and the first low-energy counting rate includes determining a plurality of photoelectric suppression factors by calculating a plurality of ratios of each second low-energy counting rate of the plurality of second low-energy counting rates to the first low-energy counting rate, each photoelectric suppression factor in the plurality of photoelectric suppression factors corresponding to each non-standard simulated case of the plurality of simulated cases.

Example 11 is the method of examples 8 and 9, wherein the predetermined energy range is between a low-energy discriminator and a lower energy limit that is a lowest energy gamma ray for spectral fitting of Thorium and Potassium.

Example 12 is the method of example 8, wherein receiving data about the subterranean formation from the gamma-ray-logging process in the wellbore includes receiving an initial estimate of a Uranium-free, gamma-ray log based on Thorium and Potassium elemental concentrations, and wherein applying the photoelectric-suppression estimator to the data includes applying the photoelectric-suppression estimator to the initial estimate of the Uranium-free, gamma-ray log based on Thorium and Potassium elemental concentrations.

Example 13 is the method of example 8, wherein correcting the data using the photoelectric-suppression factor to generate the Uranium-free, gamma-ray log includes correcting the data substantially contemporaneously with receiving the data about the subterranean formation from the gamma-ray-logging process in the wellbore.

Example 14 is the method of example 8, wherein outputting the Uranium-free, gamma-ray log comprises outputting the Uranium-free, gamma-ray log for determining elemental concentrations about the subterranean formation, wherein the elemental concentrations comprise concentrations of Thorium or Potassium.

Example 15 is a non-transitory computer-readable medium comprising instructions that are executable by a processing device for causing the processing device to perform operations comprising: receiving data about a subterranean formation from a gamma-ray-logging process in a wellbore; applying a photoelectric-suppression estimator to the data to determine a photoelectric-suppression factor using stored mud parameters and a value for a diameter of the wellbore; correcting the data using the photoelectric-suppression factor to generate a Uranium-free, gamma-ray log; and outputting the Uranium-free, gamma-ray log for determining characteristics of the subterranean formation.

Example 16 is the non-transitory computer-readable medium of example 15, wherein the instructions further comprise instructions that are executable by the processing device to cause the processing device to perform operations comprising: generating the photoelectric-suppression estimator by: generating Monte Carlo simulations of stored downhole condition data to generate simulations of a plurality of simulated cases; determining a first low-energy counting rate in a predetermined energy range for a simulated case of the plurality of simulated cases, the simulated case having standard conditions; determining a plurality of second low-energy counting rates in the predetermined energy range; determining a plurality of photoelectric suppression factors using the plurality of second low-energy counting rates and the first low-energy counting rate; and transforming the plurality of photoelectric suppression factors, wellbore diameters, mud type, mud density, and mud photoelectric index factors into an algorithm for generating the photoelectric-suppression estimator.

Example 17 is the non-transitory computer-readable medium of examples 15 and 16, wherein: the operation of generating the Monte Carlo simulations of stored downhole condition data includes generating sets of wellbore diameter data associated with sets of mud density data, each set of the sets of wellbore diameter data and each set of the sets of mud density data together being a simulated case of the plurality of simulated cases, the Monte Carlo simulations including simulated spectra with standard conditions and simulated spectra with non-standard conditions; the first low-energy counting rate is of a reference, standard condition spectrum of the Monte Carlo simulations; each second low-energy counting rate of the plurality of second low-energy counting rates corresponds to a subset of simulated cases included in the plurality of simulated cases, the subset of simulated cases having non-standard conditions; and the operation of determining a plurality of photoelectric suppression factors using the plurality of second low-energy counting rates and the first low-energy counting rate includes determining a plurality of photoelectric suppression factors by calculating a plurality of ratios of each second low-energy counting rate of the plurality of second low-energy counting rates to the first low-energy counting rate, each photoelectric suppression factor in the plurality of photoelectric suppression factors corresponding to each non-standard simulated case of the plurality of simulated cases.

Example 18 is the non-transitory computer-readable medium of examples 15 and 16, wherein the predetermined energy range is between a low-energy discriminator and a lower energy limit that is a lowest energy gamma ray for spectral fitting of Thorium and Potassium.

Example 19 is the non-transitory computer-readable medium of example 15, wherein the operation of receiving data about the subterranean formation from the gamma-ray-logging process in the wellbore includes receiving an initial estimate of a Uranium-free, gamma-ray log based on Thorium and Potassium elemental concentrations, and wherein the operation of applying the photoelectric-suppression estimator to the data includes applying the photoelectric-suppression estimator to the initial estimate of the Uranium-free, gamma-ray log based on Thorium and Potassium elemental concentrations.

Example 20 is the non-transitory computer-readable medium of example 15, wherein the operation of correcting the data using the photoelectric-suppression factor to generate the Uranium-free, gamma-ray log includes correcting the data substantially contemporaneously with receiving the data about the subterranean formation from the gamma-ray-logging process in the wellbore.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

What is claimed is:

1. A system comprising:
a processor; and
a non-transitory computer-readable medium comprising instructions that are executable by the processor to cause the processor to perform operations comprising:
receiving data about a subterranean formation from a gamma-ray-logging process in a wellbore;
generating a photoelectric-suppression estimator by:
determining a plurality of photoelectric suppression factors using a first low-energy counting rate and one or more second low-energy counting rates in a predetermined energy range of a simulated case of stored downhole condition data, and
transforming the plurality of photoelectric suppression factors and characteristics about the subterranean formation into an algorithm for generating the photoelectric-suppression estimator;
applying the photoelectric-suppression estimator to the data to determine a particular photoelectric-suppression factor using stored mud parameters and a value for a diameter of the wellbore;
correcting the data using the particular photoelectric-suppression factor to generate a Uranium-free, gamma-ray log; and
outputting, based on the Uranium-free, gamma-ray log, a command to alter a drilling operation with respect to the subterranean formation.

2. The system of claim 1, wherein the operation of generating the photoelectric-suppression estimator includes:

generating Monte Carlo simulations of the stored downhole condition data to generate simulations of a plurality of simulated cases;
determining first low-energy counting rate in the predetermined energy range for the simulated case that is included in the plurality of simulated cases, the simulated case having standard conditions; and
determining the one or more second low-energy counting rates in the predetermined energy range, and wherein the characteristics about the subterranean formation include wellbore diameters, mud type, mud density, and mud photoelectric index factors.

3. The system of claim 2, wherein:
the operation of generating the Monte Carlo simulations of the stored downhole condition data includes generating sets of wellbore diameter data associated with sets of mud density data, each set of the sets of wellbore diameter data and each set of the sets of mud density data together being a simulated case of the plurality of simulated cases, the Monte Carlo simulations including simulated spectra with standard conditions and simulated spectra with non-standard conditions;
the first low-energy counting rate is of a reference, standard condition spectrum of the Monte Carlo simulations;
each second low-energy counting rate of the one or more second low-energy counting rates corresponds to a subset of simulated cases included in the plurality of simulated cases, the subset of simulated cases having non-standard conditions; and
the operation of determining a plurality of photoelectric suppression factors using the one or more second low-energy counting rates and the first low-energy counting rate includes determining a plurality of photoelectric suppression factors by calculating a plurality of ratios of each second low-energy counting rate of the one or more second low-energy counting rates to the first low-energy counting rate, each photoelectric suppression factor in the plurality of photoelectric suppression factors corresponding to each non-standard simulated case of the plurality of simulated cases.

4. The system of claim 3, wherein the predetermined energy range is between a low-energy discriminator and a lower energy limit that is a lowest energy gamma ray for spectral fitting of Thorium and Potassium.

5. The system of claim 1, wherein the operation of receiving data about the subterranean formation from the gamma-ray-logging process in the wellbore includes receiving an initial estimate of a Uranium-free, gamma-ray log based on Thorium and Potassium elemental concentrations, and wherein the operation of applying the photoelectric-suppression estimator to the data includes applying photoelectric-suppression estimator to the initial estimate of the Uranium-free, gamma-ray log based on Thorium and Potassium elemental concentrations.

6. The system of claim 1, wherein the operation of correcting the data using the particular photoelectric-suppression factor to generate the Uranium-free, gamma-ray log includes correcting the data substantially contemporaneously with receiving the data about the subterranean formation from the gamma-ray-logging process in the wellbore.

7. The system of claim 1, wherein the operation of outputting the Uranium-free, gamma-ray log for determining the characteristics of the subterranean formation includes outputting the Uranium-free, gamma-ray log for determining concentrations of Thorium or Potassium in the subterranean formation.

8. A method comprising:
receiving, by a computing device, data about a subterranean formation from a gamma-ray-logging process in a wellbore;
generating, by the computing device, a photoelectric-suppression estimator by:
    determining a plurality of photoelectric suppression factors using a first low-energy counting rate and one or more second low-energy counting rates in a predetermined energy range of a simulated case of stored downhole condition data, and
    transforming the plurality of photoelectric suppression factors and characteristics about the subterranean formation into an algorithm for generating the photoelectric-suppression estimator;
applying, by the computing device, the photoelectric-suppression estimator to the data to determine a particular photoelectric-suppression factor using stored mud parameters and a value for a diameter of the wellbore;
correcting, by the computing device, the data using the particular photoelectric- suppression factor to generate a Uranium-free, gamma-ray log; and
outputting, by the computing device and based on the Uranium-free, gamma-ray log, a command to alter a drilling operation with respect to the subterranean formation.

9. The method of claim 8,
wherein generating the photoelectric-suppression estimator includes:
    generating Monte Carlo simulations of the stored downhole condition data to generate simulations of a plurality of simulated cases;
    determining the first low-energy counting rate in the predetermined energy range for the simulated case that is included in the plurality of simulated cases, the simulated case having standard conditions; and
    determining the one or more second low-energy counting rates in the predetermined energy range, and wherein the characteristics about the subterranean formation include wellbore diameters, mud type, mud density, and mud photoelectric index factors.

10. The method of claim 9, wherein:
the operation of generating the Monte Carlo simulations of the stored downhole condition data includes generating sets of wellbore diameter data associated with sets of mud density data, each set of the sets of wellbore diameter data and each set of the sets of mud density data together being a simulated case of the plurality of simulated cases, the Monte Carlo simulations including simulated spectra with standard conditions and simulated spectra with non-standard conditions;
the first low-energy counting rate is of a reference, standard condition spectrum of the Monte Carlo simulations;
each second low-energy counting rate of the one or more second low-energy counting rates corresponds to a subset of simulated cases included in the plurality of simulated cases, the subset of simulated cases having non-standard conditions; and
the operation of determining a plurality of photoelectric suppression factors using the one or more second low-energy counting rates and the first low-energy counting rate includes determining a plurality of photoelectric suppression factors by calculating a plurality of ratios of each second low-energy counting rate of the one or more second low-energy counting rates to the first low-energy counting rate, each photoelectric suppression factor in the plurality of photoelectric suppression factors corresponding to each non-standard simulated case of the plurality of simulated cases.

11. The method of claim 9, wherein the predetermined energy range is between a low-energy discriminator and a lower energy limit that is a lowest energy gamma ray for spectral fitting of Thorium and Potassium.

12. The method of claim 8, wherein receiving data about the subterranean formation from the gamma-ray-logging process in the wellbore includes receiving an initial estimate of a Uranium-free, gamma-ray log based on Thorium and Potassium elemental concentrations, and wherein applying the photoelectric-suppression estimator to the data includes applying the photoelectric-suppression estimator to the initial estimate of the Uranium-free, gamma-ray log based on Thorium and Potassium elemental concentrations.

13. The method of claim 8, wherein correcting the data using the particular photoelectric-suppression factor to generate the Uranium-free, gamma-ray log includes correcting the data substantially contemporaneously with receiving the data about the subterranean formation from the gamma-ray-logging process in the wellbore.

14. The method of claim 8, wherein outputting the Uranium-free, gamma-ray log comprises outputting the Uranium-free, gamma-ray log for determining elemental concentrations about the subterranean formation, wherein the elemental concentrations comprise concentrations of Thorium or Potassium.

15. A non-transitory computer-readable medium comprising instructions that are executable by a processing device for causing the processing device to perform operations comprising:
receiving data about a subterranean formation from a gamma-ray-logging process in a wellbore;
generating a photoelectric-suppression estimator by:
    determining a plurality of photoelectric suppression factors using a first low-energy counting rate and one or more second low-energy counting rates in a predetermined energy range of a simulated case of stored downhole condition data, and
    transforming the plurality of photoelectric suppression factors and characteristics about the subterranean formation into an algorithm for generating the photoelectric-suppression estimator;
applying the photoelectric-suppression estimator to the data to determine a particular photoelectric-suppression factor using stored mud parameters and a value for a diameter of the wellbore;
correcting the data using the particular photoelectric-suppression factor to generate a Uranium-free, gamma-ray log; and
outputting, based on the Uranium-free, gamma-ray log, a command to alter a drilling operation with respect to the subterranean formation.

16. The non-transitory computer-readable medium of claim 15, wherein the operation of
generating the photoelectric-suppression estimator includes:
    generating Monte Carlo simulations of the stored downhole condition data to generate simulations of a plurality of simulated cases;
    determining the first low-energy counting rate in the predetermined energy range for the simulated case that is included in the plurality of simulated cases, the simulated case having standard conditions; and determining the one or more second low-energy counting rates in the predetermined energy range, and wherein the characteristics about the subterranean formation include wellbore diameters, mud type, mud density, and mud photoelectric index factors.

17. The non-transitory computer-readable medium of claim 16, wherein:
the operation of generating the Monte Carlo simulations of the stored downhole condition data includes generating sets of wellbore diameter data associated with sets of mud density data, each set of the sets of wellbore diameter data and each set of the sets of mud density data together being a simulated case of the plurality of simulated cases, the Monte Carlo simulations including simulated spectra with standard conditions and simulated spectra with non-standard conditions;
the first low-energy counting rate is of a reference, standard condition spectrum of the Monte Carlo simulations;
each second low-energy counting rate of the one or more second low-energy counting rates corresponds to a subset of simulated cases included in the plurality of simulated cases, the subset of simulated cases having non-standard conditions; and
the operation of determining a plurality of photoelectric suppression factors using the one or more second low-energy counting rates and the first low-energy counting rate includes determining a plurality of photoelectric suppression factors by calculating a plurality of ratios of each second low-energy counting rate of the one or more second low-energy counting rates to the first low-energy counting rate, each photoelectric suppression factor in the plurality of photoelectric suppression factors corresponding to each non-standard simulated case of the plurality of simulated cases.

18. The non-transitory computer-readable medium of claim 16, wherein the predetermined energy range is between a low-energy discriminator and a lower energy limit that is a lowest energy gamma ray for spectral fitting of Thorium and Potassium.

19. The non-transitory computer-readable medium of claim 15, wherein the operation of receiving data about the subterranean formation from the gamma-ray-logging process in the wellbore includes receiving an initial estimate of a Uranium-free, gamma-ray log based on Thorium and Potassium elemental concentrations, and wherein the operation of applying the photoelectric-suppression estimator to the data includes applying the photoelectric-suppression estimator to the initial estimate of the Uranium-free, gamma-ray log based on Thorium and Potassium elemental concentrations.

20. The non-transitory computer-readable medium of claim 15, wherein the operation of correcting the data using the particular photoelectric-suppression factor to generate the Uranium-free, gamma-ray log includes correcting the data substantially contemporaneously with receiving the data about the subterranean formation from the gamma-ray-logging process in the wellbore.

* * * * *